US012323426B2

(12) United States Patent
Jardine

(10) Patent No.: US 12,323,426 B2
(45) Date of Patent: Jun. 3, 2025

(54) PARAMETER-TRIGGERED MULTIMEDIA SHARING SYSTEM

(71) Applicant: Skypod, LLC, Aventura, FL (US)

(72) Inventor: Richard Jardine, Aventura, FL (US)

(*) Notice: Subject to any disclaimer, the term of this patent is extended or adjusted under 35 U.S.C. 154(b) by 0 days.

(21) Appl. No.: 18/106,414

(22) Filed: Feb. 6, 2023

(65) Prior Publication Data

US 2023/0188524 A1    Jun. 15, 2023

Related U.S. Application Data

(63) Continuation-in-part of application No. 17/319,088, filed on May 13, 2021, now Pat. No. 11,574,065.

(51) Int. Cl.
*H04L 9/40* (2022.01)
*G06F 9/451* (2018.01)
*G06F 21/10* (2013.01)
*G06Q 20/08* (2012.01)

(52) U.S. Cl.
CPC .............. *H04L 63/10* (2013.01); *G06F 9/451* (2018.02); *G06F 21/10* (2013.01); *G06Q 20/085* (2013.01)

(58) Field of Classification Search
CPC ...................................................... G06F 21/62
See application file for complete search history.

(56) References Cited

U.S. PATENT DOCUMENTS

| 8,467,773 | B1* | 6/2013 | Soelberg et al. | ....... H04M 3/42 |
| 2003/0086438 | A1* | 5/2003 | Laumen et al. | .......... H04J 3/02 |
| 2003/0193967 | A1* | 10/2003 | Fenton et al. | ............ H04J 1/00 |
| 2014/0181149 | A1* | 6/2014 | Ilan et al. | .......... G06F 17/30058 |
| 2015/0244650 | A1* | 8/2015 | Yang et al. | ........... H04L 49/552 |

* cited by examiner

*Primary Examiner* — James J Debrow
(74) *Attorney, Agent, or Firm* — Diana Mederos

(57) ABSTRACT

A multimedia content pod produced in system of a at least one computing apparatus in connection with a hardware and software network for creating, sending, storing, and revealing multimedia. The system comprises accessing a program graphical user interface with inputs for triggering operably configured software commands to secure, store, lock, unlock, and transmit multimedia collections according to satisfaction of parameter triggers.

7 Claims, 10 Drawing Sheets

PARAMETER-TRIGGERED MULTIMEDIA SHARING SYSTEM

CROSS-REFERENCE TO RELATED APPLICATION

This application is a continuation-in-part of U.S. application Ser. No. 17/319,088 filed on May 13, 2021. The entire contents therein are incorporated by reference.

FIELD OF THE DISCLOSURE

The present disclosure pertains to systems and methods of using a computer hardware architectures with operably configured software for a parameter-triggered multimedia sharing. More specifically, the disclosure pertains to computing devices, systems, and methods for generating a multimedia content pod to be received by a recipient while remaining inaccessible to the recipient until a parameter is satisfied.

BACKGROUND OF THE DISCLOSURE

Digital messaging is widely used in the form of email, social media platform sharing, and direct messaging, and texting. Email is one of the most widely used messaging system in the world where people can send multimedia such as text, portable document files, photographs, movies, and sound clips. Email, therefore, is essentially a digital mailbox.

In traditional multimedia send-and-receive systems, a sender creates message content such as typing a letter in the body of an email graphical user interface. The sender activates or presses a send button. The email program email client sends the message to a mail server. The mail server communicates with a domain name server to locate the recipient's server. The server transfers the message with the multimedia content (text or otherwise) to the recipient's server. The recipient accesses an email program graphical user interface to access the message.

There are some variations on traditional multimedia send-and-receive systems. Social media platforms such as Instagram, Snapchat, Facebook, and TikTok allow senders to create or compile multimedia content. On these platforms, a sender can control how long the content is available to the recipient. Also, with email, messages can be scheduled to be sent to a recipient at a designated time or may be sent with a delay.

Senders using traditional platforms to transmit multimedia content electronically cannot immediately send the multimedia content, securely store the content, and then reveal the content to a recipient on command or at a desired time or date.

SUMMARY OF THE DISCLOSURE

What is needed are systems and methods for multimedia collecting, sending, storing, and receiving where a sender can transmit a multimedia compilation to a receiver and where a receiver may only access the message after a set of parameters has been satisfied.

The system comprises a plurality of servers connected via a cloud network over an Internet connection. Senders and receivers, via a computing apparatus, interact with a graphical user interface with input controls, content source, multimedia compilation sections, and navigation options. Operably configured software instructions are executed by at least one processor. The computing apparatuses comprise a memory and a processor configured for receiving instructions from a server directed toward an encrypted database. A cache acts as an intermediary between multimedia collection and input on the graphical user interface and the server.

A multimedia message pod is initiated and specified by a sender. The sender loads the pod with multimedia, identifies recipients, and designates access parameters. The multimedia is retained in a cache until a gateway opens due to a command trigger such as submission of payment. The multimedia pod is transmitted to an off-site server. The program server transmits a message to a designated recipient.

The recipient accepts or denies the multimedia pod. The sender can also cancel and discard a multimedia pod. A recipient can reject the multimedia pod.

The multimedia pod contents are inaccessible to the recipient until a trigger parameter is satisfied. The trigger parameter can be a date, time, or other condition the recipient must satisfy. Once the trigger parameter is satisfied, the recipient can access the multimedia content in the multimedia pod. The multimedia content is stored in a server database for a predetermined time. The multimedia content can then be deleted from the server. Therefore, database or storage space is increased, and memory and processing demands are reduced. In turn, the energy requirements are reduced.

BRIEF DESCRIPTION OF THE DRAWINGS

The accompanying drawings that are incorporated in and constitute a part of this specification illustrate several embodiments of the disclosure. Together with the description, the drawings serve to explain the principles of the disclosure.

REFERENCE NUMERALS OF THE FIGURES

Figure 1:
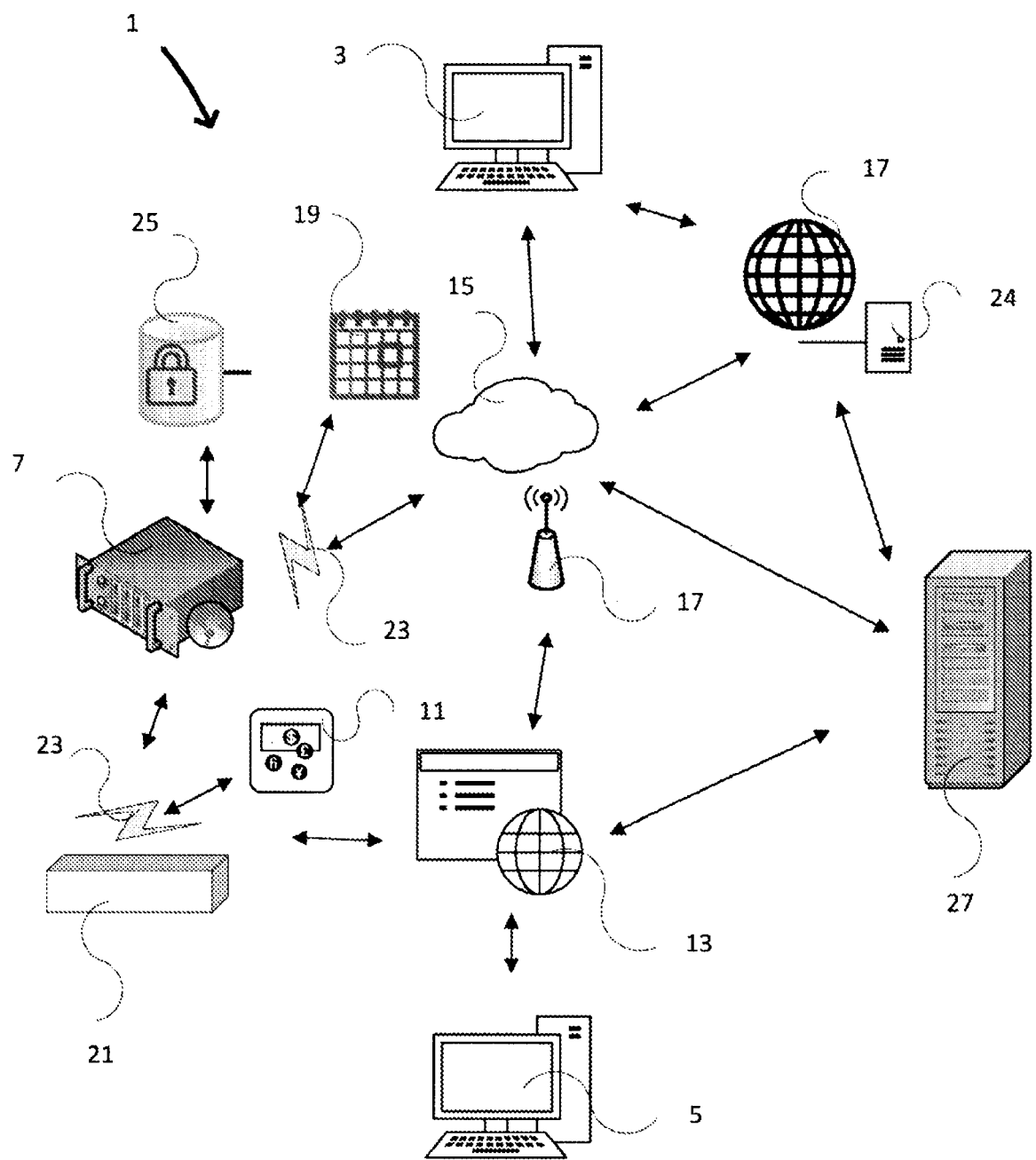
FIG. 1 shows an exemplary system platform with sender and recipient computing apparatuses.

1. System platform
3. Sender computing apparatus
5. Recipient computing apparatus
7. Application data server
9. Pod multimedia data server 11. Application data
13. Graphical user interface
15. Cloud server
17. Wireless connection
19. Trigger parameter
21. Multimedia pod
23. Cache
24. Processor
25. Software
27. Off-site server database
29. Home screen user interface
31. User portal
33. User information
35. Account details
37. Timeline display
39. Timeline
41. Outgoing pods
43. Incoming pods
45. Contacts
47. Create Pod
49. Pod creation user interface
51. Title
53. Cover image
55. Message
57. Navigation panel
59. Multimedia user interface
61. Multimedia entry box
63. Multimedia list
65. Recipient user interface
67. Recipient box
69. Recipient addition
71. Predetermined date user interface
73. Date box
75. Time box
77. Final review user interface
79. Pod identifier
81. Recipient identifier
83. Predetermined date identifier
85. Submission user interface
87. Submission button
89. Trigger parameter entry box

DETAILED DESCRIPTION

The present disclosure provides generally for systems comprising at least one computing apparatus in connection with a hardware and software network for creating, sending, storing, and revealing multimedia. The system comprises accessing a program graphical user interface with inputs for triggering operably configured software commands to secure, store, lock, unlock, and transmit digital multimedia collections according to satisfaction of parameter contingencies or triggers.

Generally, a sender accesses a computing device having a wireless connection receiver and a transmitter, memory, a process, and a database stored with operably configured software. The software is loaded to present a graphical user interface which provides sender and recipient inputs. The software program is stored on a remote cloud server and accessed over a wireless connection. The software program platform receives and transmits commands input by a sender through the graphical user interface. The sender initiates multimedia pod creation, uploads multimedia content, designates recipients, and designates trigger parameters.

A pod is a digital lockbox that contains singular or a compilation of multimedia in a data-secure manner such as substantially constant encryption. Multimedia includes documents, audio, video, and text, code, passkeys, and combinations thereof. Multimedia further includes blockchain recordation and cryptocurrency. Multimedia may be content previously generated and uploaded to the system platform. Multimedia may also be content substantially contemporaneously generated within the system platform. For example, the system platform graphical user interface may provide for users to record audiovisual material or manually input text into the system at the multimedia collection or generation phase.

The generated multimedia pod and its contents are stored in a cache until a parameter trigger is satisfied within a given time period. For example, payment submission may prompt the operably configured software to cause a processor to execute commands to transmit the multimedia pod from the cache to an off-site server where the multimedia pod and its contents are stored in a secure manner such as with encryption. Backups may be generated.

The recipient receives a message or a notification explaining the sender has sent the recipient a multimedia pod. The recipient accesses the program platform user interface. The recipient can accept or reject the pod. If the pod is accepted, the recipient can initiate access once predetermined trigger parameters are satisfied.

If the pod is rejected, the recipient may have a predetermined amount of time remaining to change his/her mind, or the recipient-entered information will cause the processor to process commands for multimedia pod destruction for that particular recipient. A sender can control access by initiating a retraction of the multimedia pod via user inputs on the program graphical user interface. A sender may be notified if and when a recipient accepts or denies the multimedia pod. In some embodiments, multimedia pods may self-destruct if excessive attempts are made, if a system or database is compromised, or if a trigger parameter is satisfied.

Multimedia pod creation, submission, and access is driven by the presentation of trigger parameters and satisfaction of trigger parameters. Trigger parameter satisfaction acts as a regulator for controlling multimedia content access. Trigger parameters are programmed in software code with logic flows with commands that are processed by a processor and transmitted to a server which in turn affects multimedia pod access be either a sender or by a recipient.

Trigger parameters include sender-determined dates or events. Examples of sender-determined dates are a specific date, a specific time, a time-window such as a month, year, week, or hour. Sender-determined events may be non-specific or contingent. Examples of sender-determined events include upon the birth or death of an individual, a first day of school for a future child, a last day of school for a future grandchild, or upon a legal event such as a divorce, naturalization, release from incarceration, administration of an estate, upon hospitalization, or upon an emergency.

The system eliminates the need for digital libraries, prevents data corruption and inconsistencies, substantially reduces the risk of hacking via obtaining access keys and passwords as with conventional data protection measures. The system provides senders with options not possible with traditional digital messaging options. The system provides senders with a substantially secure method for pre-sending multimedia to at least one recipient, notifying the recipient he/she has been sent a multimedia pod that can only be accessed upon satisfaction of a trigger parameter, and then providing such access.

In preferred embodiments, the trigger parameter is a future date or time. In other embodiments, trigger parameters may be the happening of a life event, environmental events or conditions, a digital or physical acquisition, a personal health status, any event, and combinations thereof. Trigger parameter satisfaction or non-satisfaction may initiate multimedia content scans for viruses or malware. Trigger parameter satisfaction or non-satisfaction may initiate encryption, decryption, file compression, file decompression, or encoding. In preferred systems, the entirety of the multimedia in a multimedia content pod is encrypted and transmitted to a single-point recipient.

In some embodiments the system platform may include digital or physical connection to sensors, timers, calendars, clocks, first responder systems, legal or public record docketing or database systems, health monitoring systems, cameras, microphones, or any other data collection device or system. It is anticipated such extended connections to the multimedia pod system platform may be paired with artificial intelligence and/or machine learning for setting, identifying, and satisfying (or not satisfying) trigger parameters. For example, it is anticipated that a trigger parameter can be the recordation of a death certificate in the public records, a temperature drop of 40 degrees, an elevated blood pressure reading, the dispatch of an ambulance to a particular address, audiovisual capture of an occurrence, or commencement of estate or trust administration by an administrator or a trustee.

Referring now to FIG. 1, an exemplary system platform with sender and recipient computing apparatuses is shown. Generally, application data and pod multimedia data are stored in separate servers. In other words, exemplary embodiments contain an application data server and contain a pod multimedia data server. Application data is loaded to a sender's computing apparatus such as a personal computer or mobile device and accessed via a graphical user interface via cloud servers and a wireless connection.

Multimedia pod transmission is regulated by trigger parameters that act as gatekeepers. The multimedia pod is temporarily stored in a cache until a gateway triggering parameter is satisfied such as a payment made or a promotional code entered by a sender in the graphical user interface. The parameter entry is processed by a processor along with commands from operably configured software to initiate a release from the cache and to execute commands to transmit the multimedia pod from the cache to an off-site server database. The multimedia pod remains secure in the server database until a recipient satisfies a trigger parameter, or a sender retracts the multimedia pod.

The recipient accesses the program platform graphical user interface on a computing apparatus. The recipient inputs responses to prompts and can request access to the contents of the multimedia pod. Access is only granted upon satisfaction of the predetermined trigger parameter set by the sender. The parameter entry satisfaction by the recipient is processed by a processor along with commands from operably configured software to initiate a release from the off-site server database to be transmitted over a wireless connection on a cloud network and to the recipient's server. The recipient can access the content through the program graphical user interface. The multimedia may be restricted to access only within the program environment or may be unrestricted for downloading.

Figure 2:
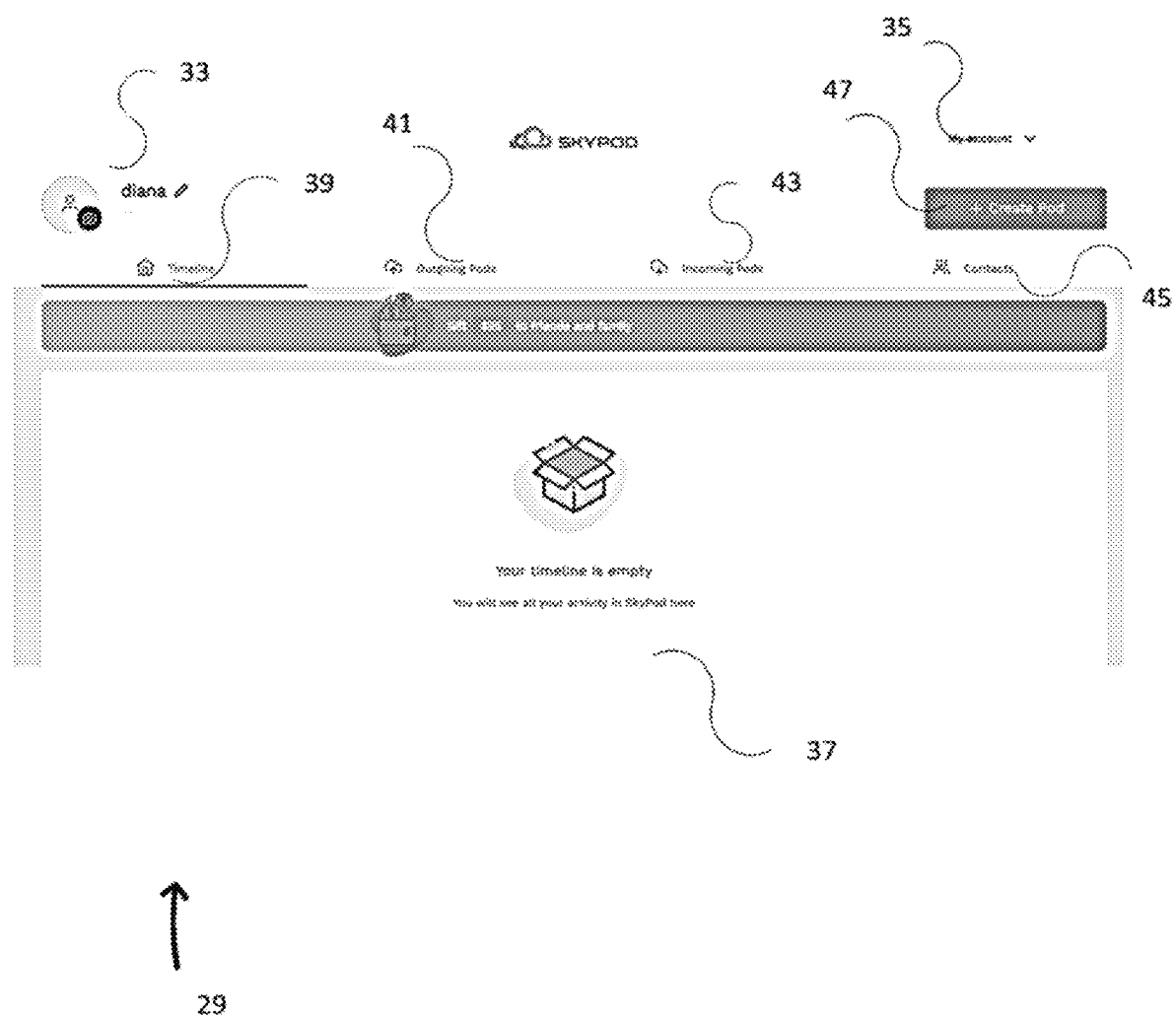
FIG. 2 shows an exemplary graphical user interface for a system platform home screen.

Referring now to FIG. 2, an exemplary graphical user interface for a system platform home screen is shown. The home screen presents a user portal whereby a user, either a sender or a recipient, can launch a new pod creation, view multimedia, and edit parameter triggers, view basic statistics and user information, and view basic pod information. Specifically, a user can view and access user information, account details, and view a timeline display. A user can select navigation buttons for content such as a timeline, outgoing pods, incoming pods, and contacts. A user can select a button to create a pod.

Figure 3:
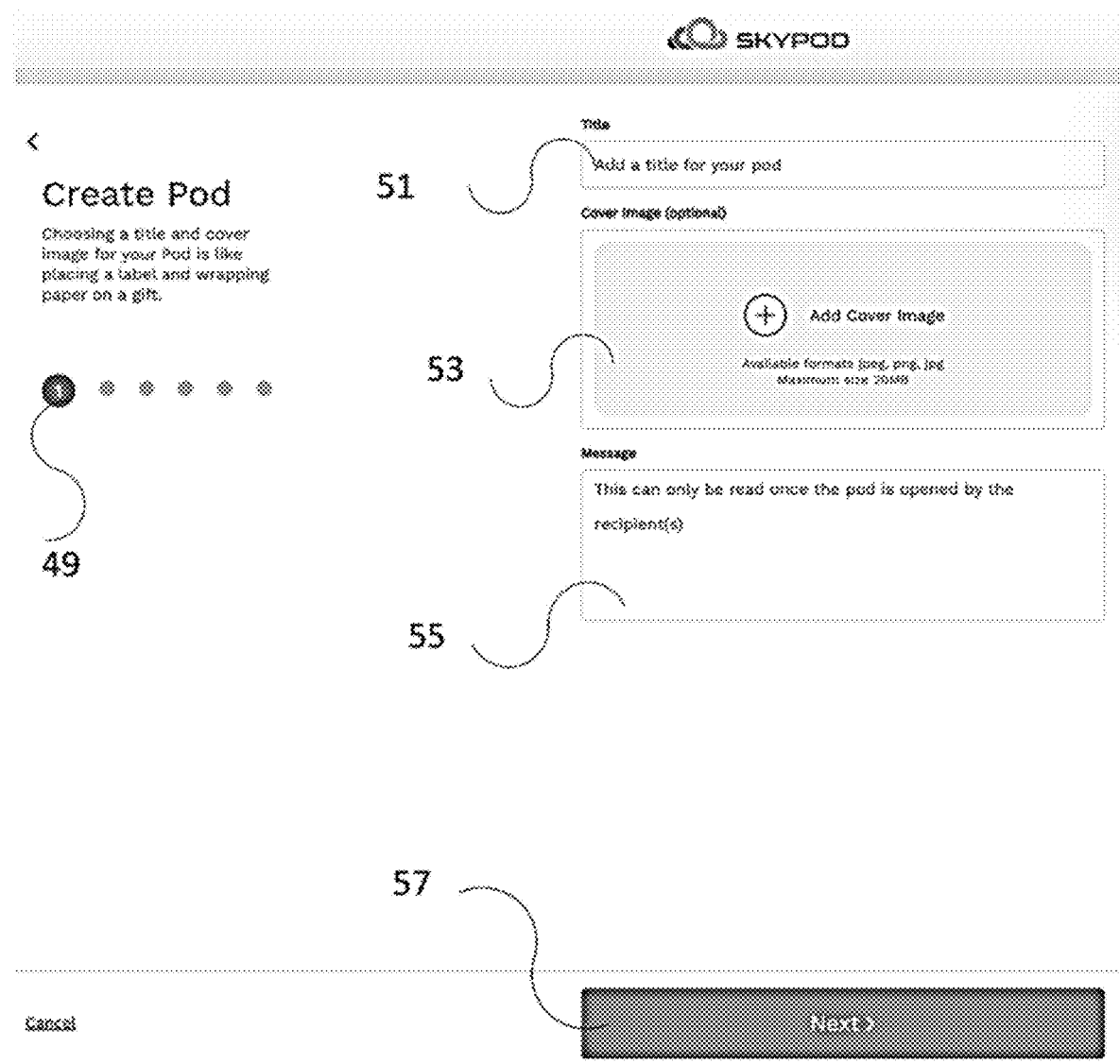
FIG. 3 shows an exemplary graphical user interface for multimedia pod creation.

Referring now to FIG. 3, an exemplary graphical user interface for multimedia pod creation is shown. A pod creation use interface shows a detail entry boxes for information such as a title, a cover image, a message, and also shows a navigation button. Detail entry boxes may have custom fields. Pods may be created singularly or in bulk. Creating a pod is creating a digital lock box. The pod creation user interface includes sections to add a title, a cover image, and a message. The interface also includes a navigation panel to proceed to the next step, return, or cancel.

Figure 4:
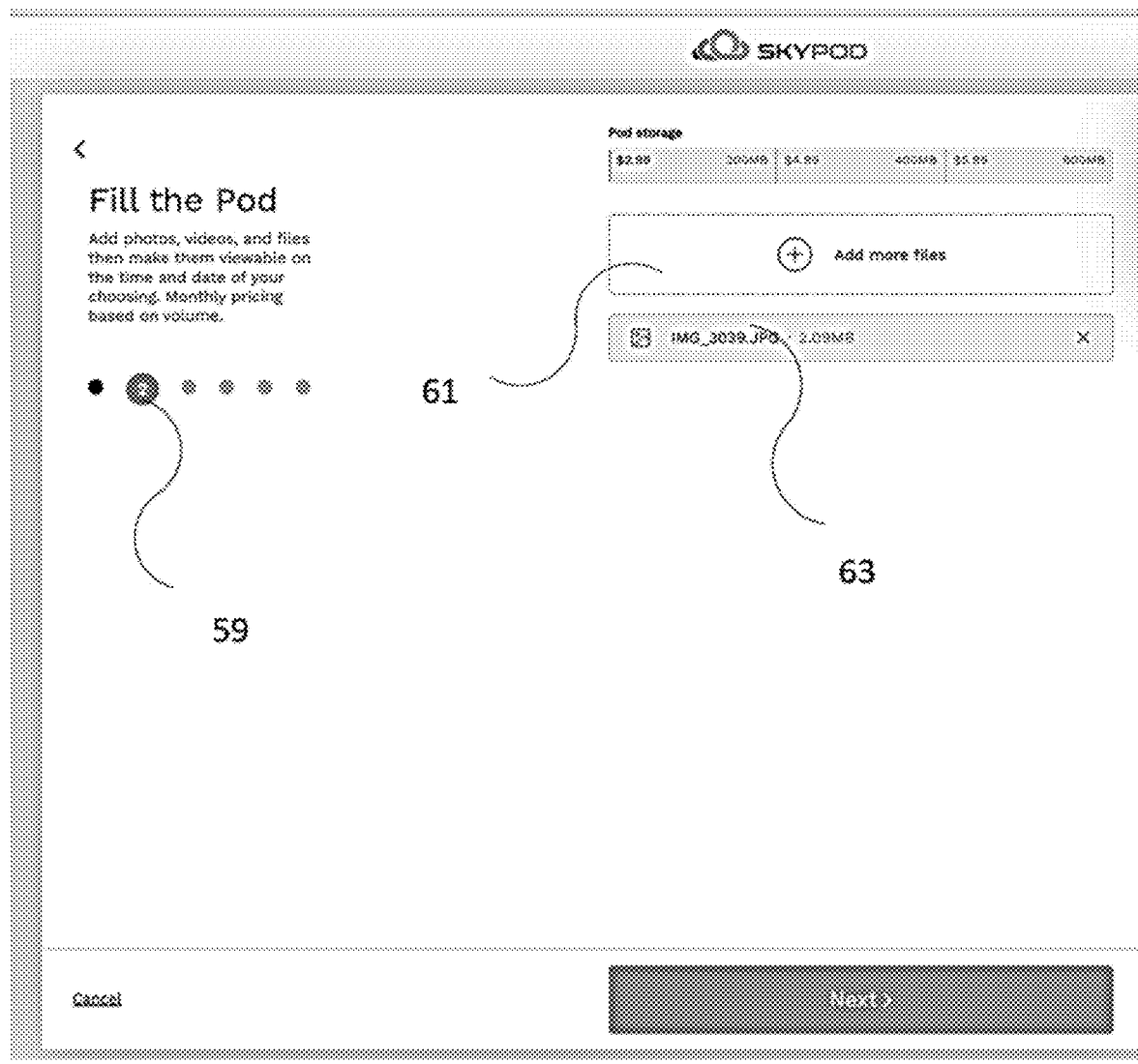
FIG. 4 shows an exemplary graphical user interface for uploading multimedia to a pod.

Referring now to FIG. 4, an exemplary graphical user interface for uploading multimedia to a pod is shown. A multimedia user interfaces shows a multimedia entry box and a multimedia list. A sender can upload, compress, edit, arrange, create, and compile multimedia. The graphical user interface may present multimedia entry boxes for direct input or drop box-type functions for uploading multimedia content. A multimedia list displays the multimedia file name, size, and file extension type.

Figure 5:
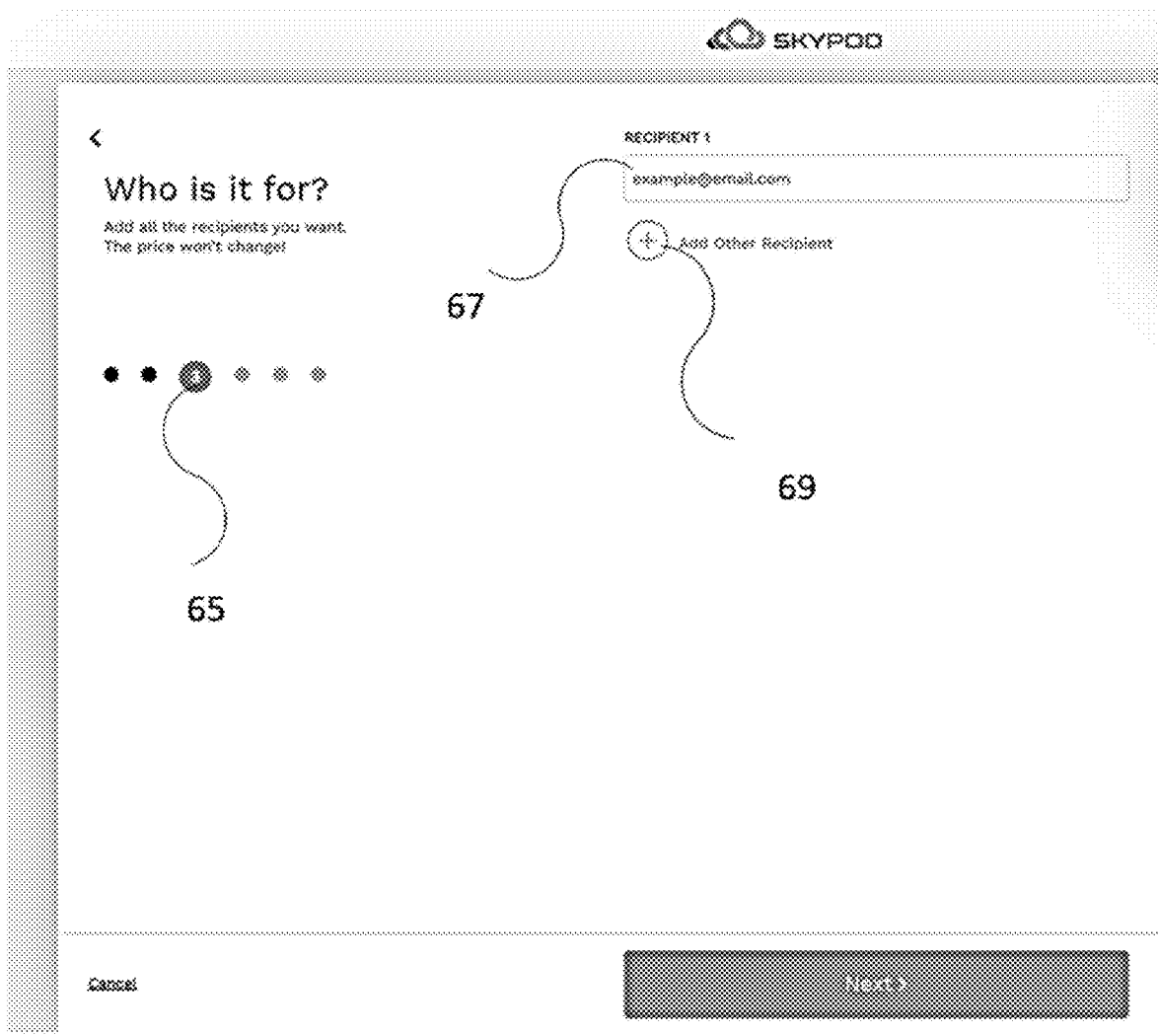
FIG. 5 shows an exemplary graphical user interface for designating recipients.

Referring now to FIG. 5, an exemplary graphical user interface for designating recipients is shown. A recipient user interface shows a recipient box and a recipient addition button. Recipients may be designated by at least an email address. Backup email addresses may also be supplied. Heirs and beneficiaries may also be included. A single multimedia pod can be directed to a single person or to multiple persons. Alternative contact information such as physical addresses and phone numbers may be included.

In the event the intended recipient is not able to access the multimedia pod after a short-term or long-term passage of time, heirs or beneficiaries may be notified and may be granted access.

Figure 6:
FIG. 6 shows an exemplary graphical user interface for entering triggering parameter information.

Referring now to FIG. 6, an exemplary graphical user interface for entering triggering parameter information is shown. A predetermined date user interface shows a date box and a time box. A sender may be prompted to select or generate trigger parameters. The selections or triggers are incorporated into the software code for conditional execution by a processor. In this exemplary embodiment, the trigger parameter is a specific date in the future. In other words, although the recipient is notified he/she has been sent a multimedia pod, he/she cannot access the contents until a particular date has been reached.

Figure 7:
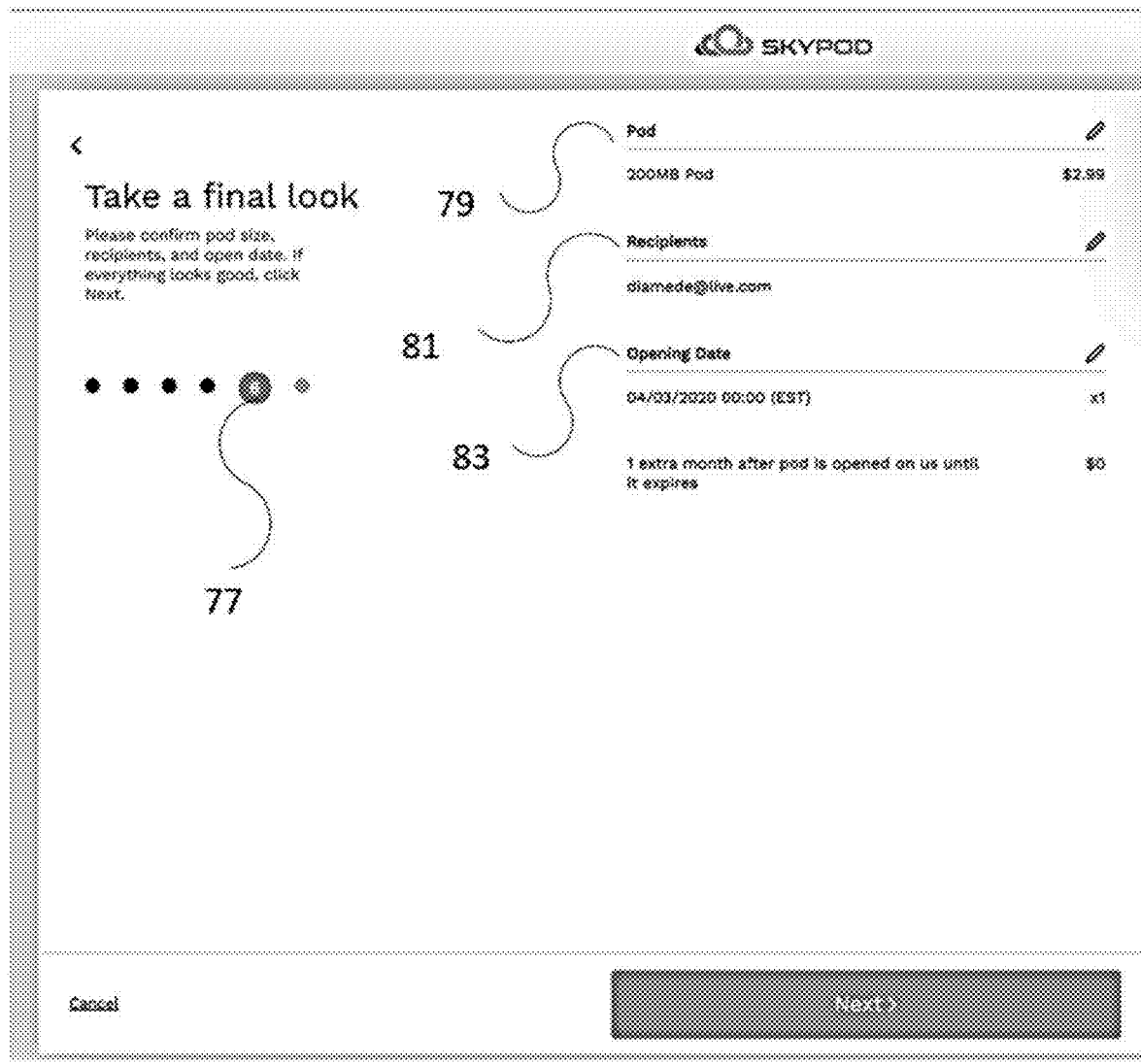
FIG. 7 shows an exemplary graphical user interface for final review of the pod generated, its contents, and the triggering parameters.

Referring now to FIG. 7, an exemplary graphical user interface for final review of the pod generated, its contents, and the triggering parameters is shown. Parameters shown include pod, recipient, and predetermined date identifiers. At this point, the multimedia uploaded is temporarily stored in the cache. A sender may review the basic information and has a chance to make changes. Parameters may be changed. In embodiments where trigger parameters may not be changed, the multimedia pod may need to be re-created for security reasons.

Figure 8:
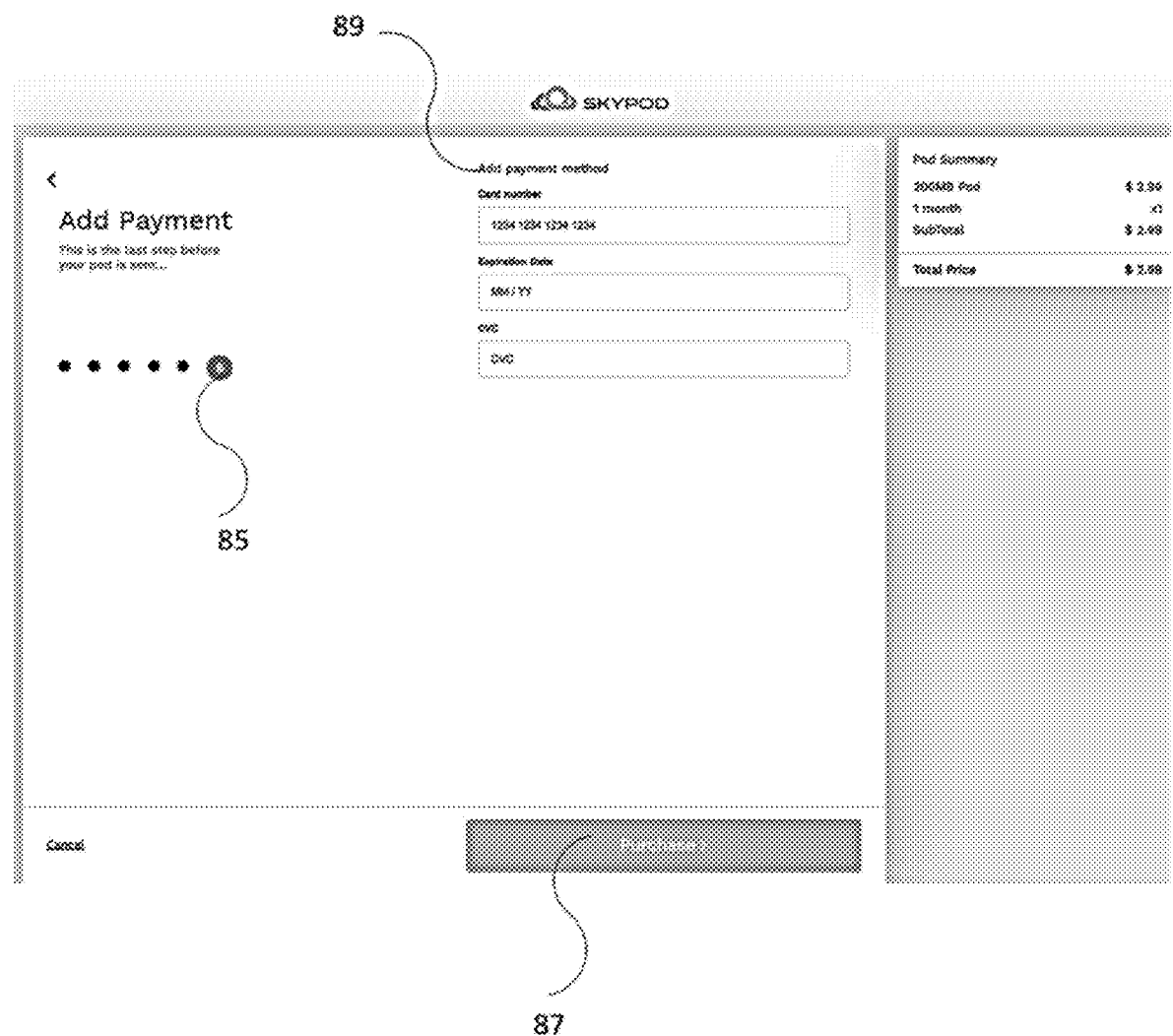
FIG. 8 shows an exemplary graphical user interface for a gateway triggering parameter for allowing transmission of the multimedia pod from a cache to an off-site server.

Referring now to FIG. 8, an exemplary graphical user interface for a gateway triggering parameter for allowing transmission of the multimedia pod from a cache to an off-site server is shown. In a submission user interface, a submission button and trigger parameter entry section are shown. The exemplary graphical user interface shows the gateway trigger parameter that once satisfied will allow the multimedia pod to be released from the cache and transmitted to the secure off-site server. In this case, the gateway trigger parameter is submission of payment of an access fee or receipt of a payment of a fee. In some embodiments, trigger parameter satisfaction may need to be completed once or multiple times at various maintenance intervals. For example, a sender may require a recipient to pay a maintenance fee every year until the trigger parameter is satisfied.

Figure 9:
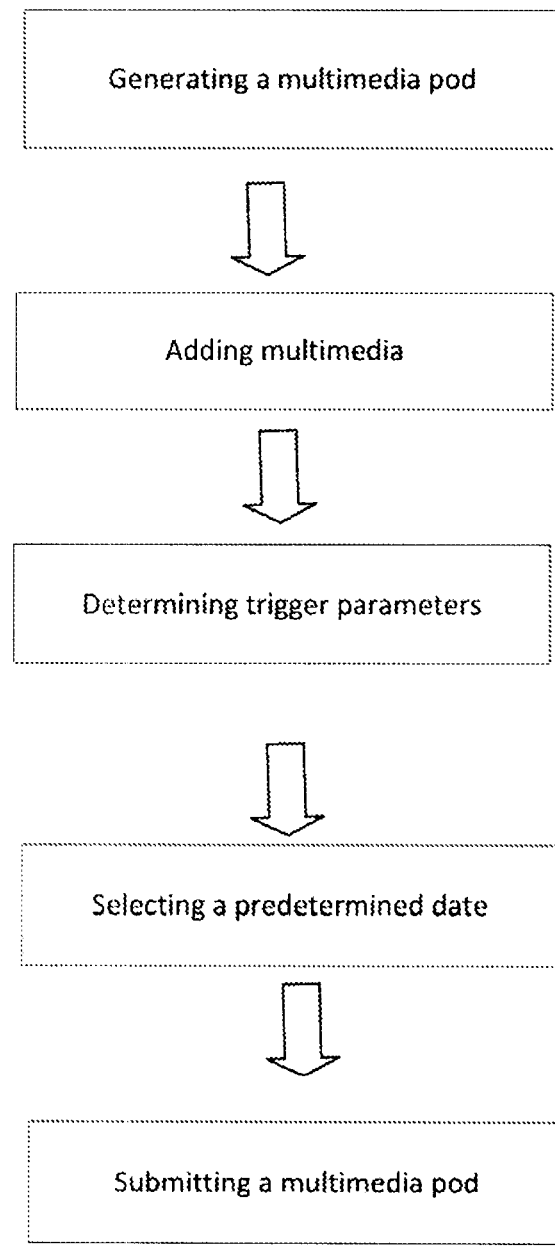
FIG. 9 shows exemplary method steps for generating a multimedia content pod to be received by a recipient while remaining inaccessible to the recipient until a parameter is satisfied.

Referring now to FIG. 9, exemplary method steps for generating a multimedia content pod to be received by a recipient while remaining inaccessible to the recipient until a parameter is satisfied are shown. In preferred embodiments, the multimedia in the content pod remains in a locked status and encrypted after the recipient accepts the pod. However, if a recipient rejects the pod, access or future access to the pod contents by the recipient is revoked.

Figure 10:
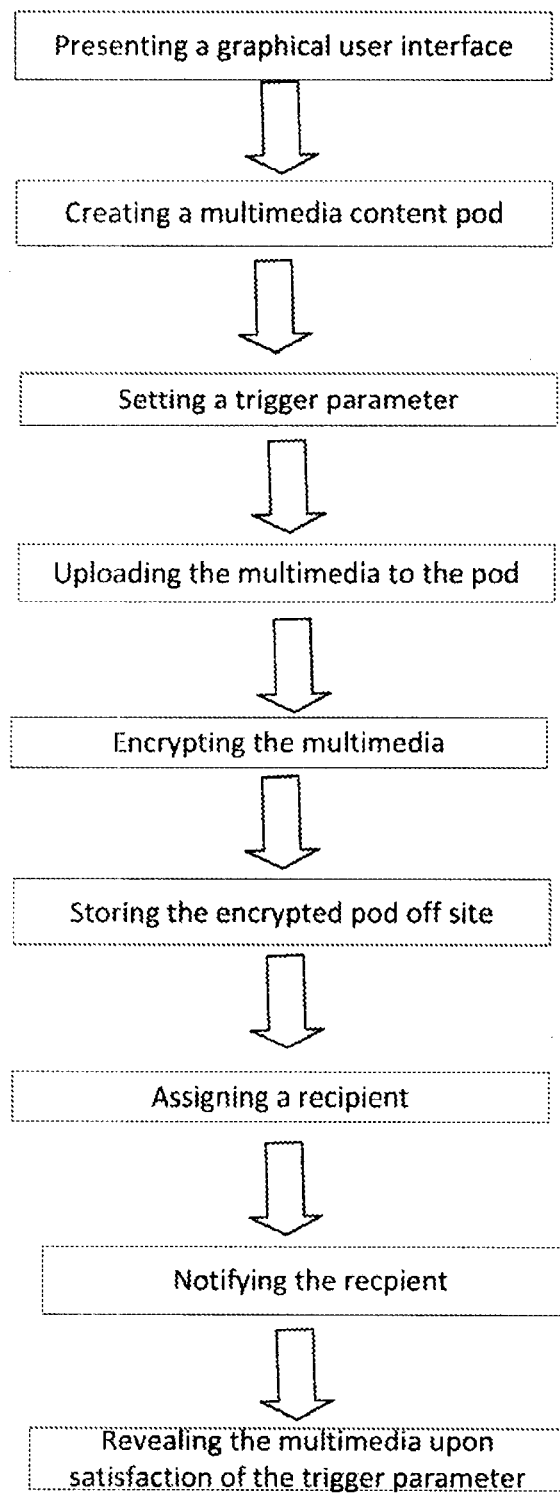
FIG. 10 shows exemplary computerized method steps.

Referring now to FIG. 10, exemplary computerized methods steps are shown. Generally, a graphical user interface generated is by a processor executing commands from operably configured software. The sender creates a multimedia pod wherein the entirety of the multimedia are temporarily stored in a cache until the trigger parameter is satisfied. The sender also sets a trigger parameter. The multimedia pod with the entirety of its contents is uploaded to an off-site server, encrypted, and stored until revealed upon satisfaction of the trigger parameter. The sender also assigns a recipient who is notified it has been assigned a multimedia pod with a trigger parameter and has the option to accept or reject the pod.

CONCLUSION

A number of embodiments of the present disclosure have been described. While this specification contains many specific implementation details, they should not be construed as limitations on the scope of any disclosures or of what may be claimed. Rather the specification presents descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. Various modifications may be made without departing from the spirit and scope of the claimed disclosure.

What is claimed is:

1. A computerized method of producing a multimedia content pod from a single sender to be received by a single-point recipient while remaining inaccessible to the recipient until a pre-defined sender-determined date trigger parameter is satisfied, the method steps comprising:
   presenting a graphical user interface generated by a processor executing commands from operably configured software;
   creating a multimedia pod wherein the entirety of the multimedia are temporarily stored in a cache until the sender-determined date trigger parameter is satisfied;
   setting the sender-determined date trigger parameter;
   uploading the multimedia in its entirety to one multimedia content pod;
   encrypting the multimedia in the multimedia content pod in its entirety;
   storing the encrypted multimedia content pod in a single off-site server point;
   assigning a single-point recipient;
   notifying the single-point recipient that the single-point recipient has been assigned a multimedia content pod with a pre-defined sender-determined date trigger parameter; and
   revealing the multimedia content of the multimedia content pod to the single-point recipient via a graphical user interface upon satisfaction of the sender-determined date trigger parameter.

2. The method of claim 1 further comprising providing multimedia content pod accept and reject options via a graphical user interface to the single-point recipient.

3. The method of claim 2 wherein the single-point recipient chooses to accept the multimedia content pod, maintaining the multimedia content pod in a locked status until the sender-determined date trigger parameter is satisfied.

4. The method of claim 3 further comprising satisfying the sender-determined date trigger parameter to unlock the multimedia content pod, revealing the multimedia in the multimedia content pod.

5. The method of claim 2 wherein the single-point recipient chooses to reject the multimedia content pod, revoking access to the multimedia pod contents.

6. The method of claim 1 wherein the sender-determined date trigger parameter is based on a sender-determined event.

7. The method of claim 6 wherein the trigger parameter is receipt of payment of an access fee.

* * * * *